United States Patent [19]

Golan

[11] 4,166,439

[45] Sep. 4, 1979

[54] MODIFIED ENGINE CONTROLLING SYSTEM

[76] Inventor: Hanan Golan, 31 Baal Shem-Tov, Holon, Neot Rahel, Israel

[21] Appl. No.: 844,461

[22] Filed: Oct. 21, 1977

[51] Int. Cl.$^2$ ............................. F02P 5/04; F02B 3/00
[52] U.S. Cl. ............................. 123/117 R; 123/117 A; 123/32 EA
[58] Field of Search ....... 123/117 R, 117 A, 146.5 A, 123/32 EA

[56] References Cited

U.S. PATENT DOCUMENTS

| | | | |
|---|---|---|---|
| 2,628,606 | 2/1953 | Draper et al. | 123/117 R |
| 3,142,967 | 8/1964 | Schwitzer | 123/117 A |
| 3,156,228 | 11/1964 | Blackwood | 123/117 R |
| 3,596,643 | 8/1968 | Schwitzer | 123/117 A |
| 3,710,766 | 1/1973 | Beishir | 123/32 EA |
| 4,015,566 | 4/1977 | Wahl | 123/117 R |
| 4,016,843 | 4/1977 | Dorrego | 123/117 R |
| 4,048,479 | 9/1977 | Rivere | 123/32 EA |
| 4,064,846 | 12/1977 | Latsch et al. | 123/32 EA |
| 4,080,939 | 3/1978 | Love | 123/117 R |

*Primary Examiner*—Charles J. Myhre
*Assistant Examiner*—P. S. Lall
*Attorney, Agent, or Firm*—Blakely, Sokoloff, Taylor & Zafman

[57] ABSTRACT

An improved engine control system for engines is disclosed. The preferred embodiment is a closed loop, free running control system comprising apparatus for (i) sensing an engine performance parameter, (ii) selectively adjusting an engine control parameter in response to a control signal, and (iii) controlling the engine control parameter to optimize the engine performance parameter. The control system is adapted to optimize the performance parameter by adjustment of the single engine control parameter. In the preferred embodiment, engine speed is utilized as the engine control parameter, and spark timing as the engine control parameter, although other parameters may be utilized. Other embodiments and improvements are disclosed.

1 Claim, 8 Drawing Figures

MODIFIED ENGINE CONTROLLING SYSTEM

BACKGROUND OF THE INVENTION

1. Field of the Invention

The present invention relates to the field of control systems for engines, and in particular to control systems for optimizing engine performance.

2. Prior Art

One type of engine control system is the ignition system, which provides a timed spark for igniting the fuel and air mixture. The performance of the engine is highly dependent upon the precise instant at which the spark is delivered to the combustion chamber. Thus, even though in the typical engine, the throttle is the primary control for varying the engine speed, if the spark is not delivered at the appropriate instant, the engine speed for that throttle setting will not be optimized.

The most common ignition system for internal combustion engines is that generally known as the Kettering ignition system. The Kettering system comprises generally a primary, low voltage circuit, and a secondary, high voltage circuit. The primary circuit includes the battery, distributor cam-operated breaker points and the heavy primary windings of the ignition coil. The secondary circuit includes the secondary windings of the ignition coil, the distributor rotor, cap, ignition cables and spark plugs. When the breaker points are closed, the primary circuit is completed through ground, allowing current to flow in the primary circuit through the primary windings, building a magnetic field in the coil. As the engine rotates, the cam within the distributor housing is turned, pushing against the rubbing block of the points and forcing the breaker points apart. Separation of the breaker points interrupts the primary circuit and stops the primary current flow. When the current flow stops, the magnetic field in the coil collapses through the secondary windings. Field collapse induces a momentary high voltage surge in the secondary windings. At this instant the rotor tip is lined up with the proper distributor cap electrode. The high voltage surge is impressed through the ignition cable to the spark plug, causing an arc to form across the spark plug gap to ignite the fuel mixture.

Various improvements have been made to the Kettering system to increase the voltage available to the spark plug, improve reliability and reduce maintenance. One such improvement is the "transistorized" ignition, wherein the breaker points serve only to switch on and off a power transistor, through which the primary current flows. The current flow through the points is greatly reduced, increasing point longevity, and primary current can be increased, thereby increasing the resultant secondary high voltage.

Another popular type of ignition system is the capacitive discharge ignition. This system utilizes a capacitor as the primary energy source. An inverter is typically used to step up the battery voltage and charge the capacitor. An electronic switching element is then used to discharge the capacitor into the primary windings of the ignition coil, inducing a high voltage impulse at the secondary windings and a high voltage pulse at the spark plugs.

Regardless of the system used, the spark must be delivered to the spark plug at the right instant to optimize engine performance. In the conventional automotive ignition system, the timing of the ignition spark is controlled by rotating the distributor housing a few degrees in the required direction to either retard or advance the spark timing. The breaker points are coupled to the housing, and rotate with it. When the desired spark timing is achieved, the housing is secured in position. Modern ignition systems utilize centrifugal mechanical advance mechanisms and vacuum timing advance mechanisms to change ignition timing to compensate for throttle position and engine load. These mechanisms, however, are relatively crude devices, preadjusted at the automotive factory and typically not adjusted unless a perceptible problem develops. Moreover, the timing advance curve is selected for a given engine or vehicle model, and is used for many vehicles; no fine-tuning is utilized to peak the engine speed and efficiency. As the engine wears and the ignition system deteriorates, the timing may also change, requiring frequent ignition tune-ups to maintain performance at an acceptable level.

Some modern automobile engines are fitted with minicomputers which receive inputs from a plurality of sensors monitoring factors such as engine RPM, manifold vacuum, engine temperature, and exhaust emissions content, and adjusting the spark timing to a preset value based upon such factors. Such systems are expensive, requiring complex circuitry and a plurality of sensors, suffer from reliability problems, and still do not adjust the timing to that value which optimizes performance necessarily, but rather to a preset value not based solely upon engine performance.

SUMMARY OF THE INVENTION

A modified engine control system for engines is disclosed, whereby an engine control parameter, such as spark timing or fuel mixture may be adjusted to optimize an engine performance parameter, such as engine speed. The disclosed control system is a closed loop, free-running system, i.e. the system is constantly varying the control parameter to maximize or otherwise optimize the performance parameter; no other parameter need be sensed, and no external control input is utilized or needed. The invention generally comprises (i) sensing means for generating an output representative of engine performance, (ii) adjustment means responsive to a control signal for adjusting an engine control parameter, and (iii) controller means for controlling the adjustment means to optimize the engine performance.

In one embodiment disclosed, the engine performance parameter sensed is engine speed, and the engine control parameter adjusted is ignition spark timing. The sensing means comprises an RC circuit receiving pulses from the distributor points, and the adjustment means comprises a stepping motor with driver coupled to the distributor housing for incremental rotation of the distributor housing. The controller in this embodiment is electronic and comprises a pair of sample and hold circuits, for sampling the measurement means before and after an incremental timing adjustment is performed, and a comparator for comparing the magnitudes of engine speed before and after the timing adjustment. The comparator issues a control signal to the stepping motor. If the RPM increases, the controller instructs the adjustment means to increment positively, i.e., in the same direction as the last increment. If RPM decreases, the adjustment means is to increment negatively, i.e., in the opposite direction from the last increment.

In an alternative embodiment, the adjustment means is electronic, comprising a ramp generator triggered by the opening of the breaker points, a variable voltage source controlled by the controller, and a Schmitt trigger. The ramp generator and voltage source are the inputs to the Schmitt trigger, so that when the magnitudes of the ramp and voltage source are equal, the Schmitt trigger fires, triggering an electronic switching element of the ignition system.

Other embodiments and improvements are disclosed.

DETAILED DESCRIPTION OF THE INVENTION

Figure 3:
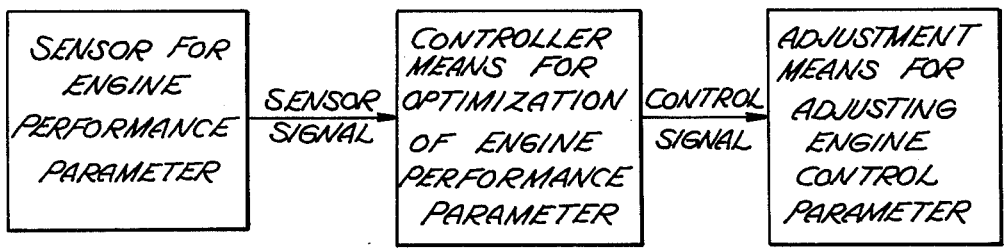
FIG. 3 is a block diagram illustrating the essential elements of the present invention.

The present invention comprises a modification to engine control systems. The basic elements of the present invention are shown in the block diagram of FIG. 3. These elements are (i) sensing means for producing a signal representative of engine performance, (ii) adjustment means for adjusting or tuning an engine control parameter in response to a control signal, and (iii) controller means coupled to the sensing means and to the adjustment means for varying the engine control parameter, sensing the corresponding change in the engine performance parameter, and providing the control signal to adjust the control parameter to optimize the performance parameter. The invention may be utilized with substantially all types of engines, and is well suited for vehicle engines used in industrial and construction industry applications, such as engines driving electrical generators, pumps, compressors and the like. The particular performance parameter monitored will depend upon the engine type and application, but will be a parameter indicative of the performance of the engine. Performance in some applications may be measured or indicated by such factors as engine speed, torque output, fuel economy, or in the industrial examples mentioned above, electrical generator output, pump output, air compressor pressure, or the like.

There are also a variety of engine control parameters which could be utilized, again depending upon engine type and application. Examples are ignition spark timing, fuel to air ratio, and the amount of pressure boost for engines fitted with turbochargers. Other parameters which could be utilized will be apparent to those skilled in the art. In the specific embodiments shown in the FIGURES, ignition spark timing and engine speed are selected as the control parameter and performance parameter. These parameters are selected by way of illustration only, and not intended to limit the scope of the present invention to these particular parameters.

Figure 1:
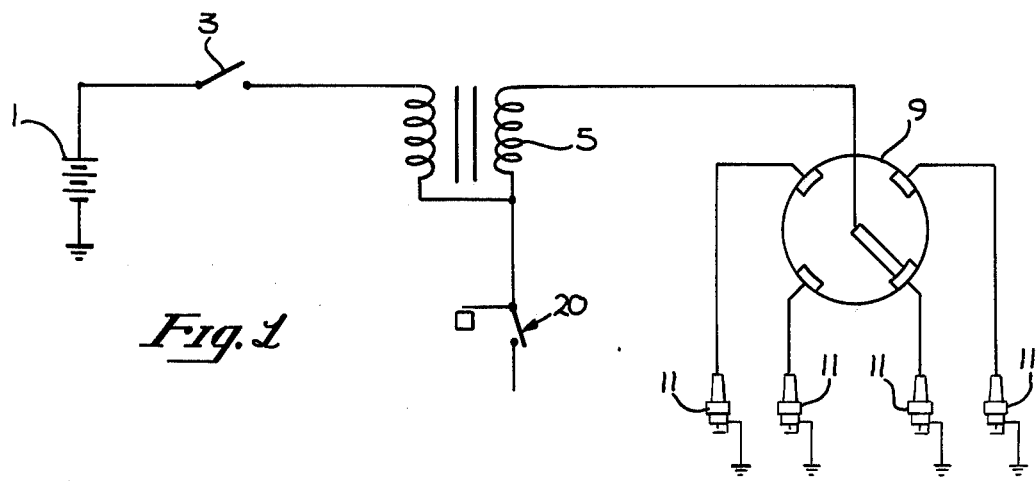
FIG. 1 is a schematic diagram of the conventional Kettering ignition system.

Referring now to FIG. 1, the schematic diagram of the conventional Kettering automotive ignition system is shown. The system comprises a battery 1, ignition switch 3, a distributor cam 7 having contact breaker points 20 coupled thereto, a coil 5 having primary and secondary windings, and distributor cap 8 with rotor, wires and spark plugs 11 attached thereto. If the ignition switch 3 and breaker points 20 are closed, current flow through the primary windings of the coil induces a magnetic field in coil 5. When the contact breaker points 20 open because of rotation of cam 7, current flow in the primary circuit is interrupted, causing collapse of the magnetic field, which induces a high voltage pulse in the secondary windings of the coil 5 which is delivered to the spark plugs 11 via the distributor 9. The timing of the delivery of the spark is controlled on such conventional systems by either manually rotating the distributor housing to give a preset timing advance or delay and/or by vacuum controlled and centrifugal advance means in the distributor to advance or retard the spark as conditions change.

Figure 2:
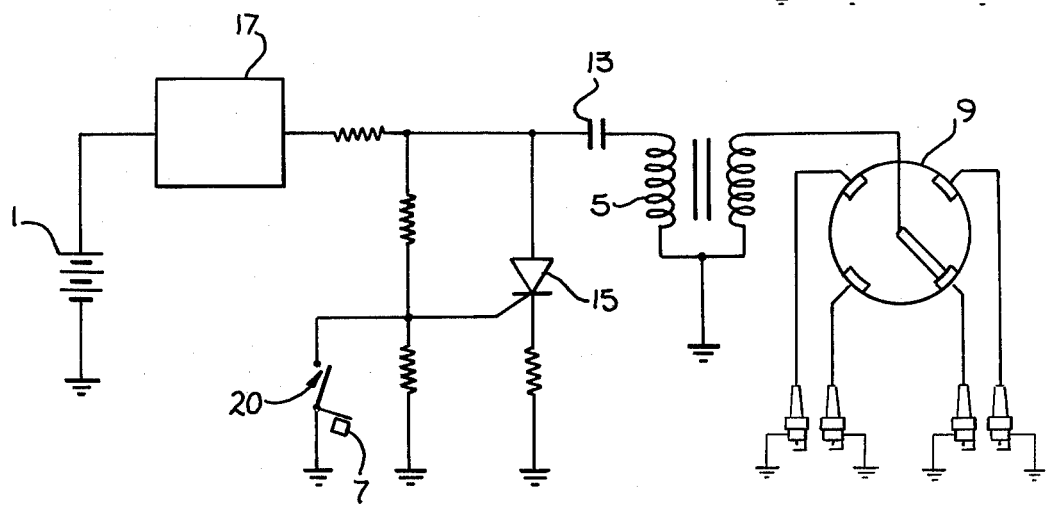
FIG. 2 is a schematic diagram of the conventional capacitive discharge ignition.

FIG. 2 is a schematic diagram of a typical capacitive discharge ignition. Instead of utilizing the collapse of the magnetic field to generate a high voltage pulse in the secondary side of the ignition coil 5, the system utilizes capacitor 13 as the primary energy source. This system is also triggered by the opening of the contact points; in this case, opening the contact point trigger and electronic switch, the silicon controlled rectifier (SCR) 15.

Figure 4:
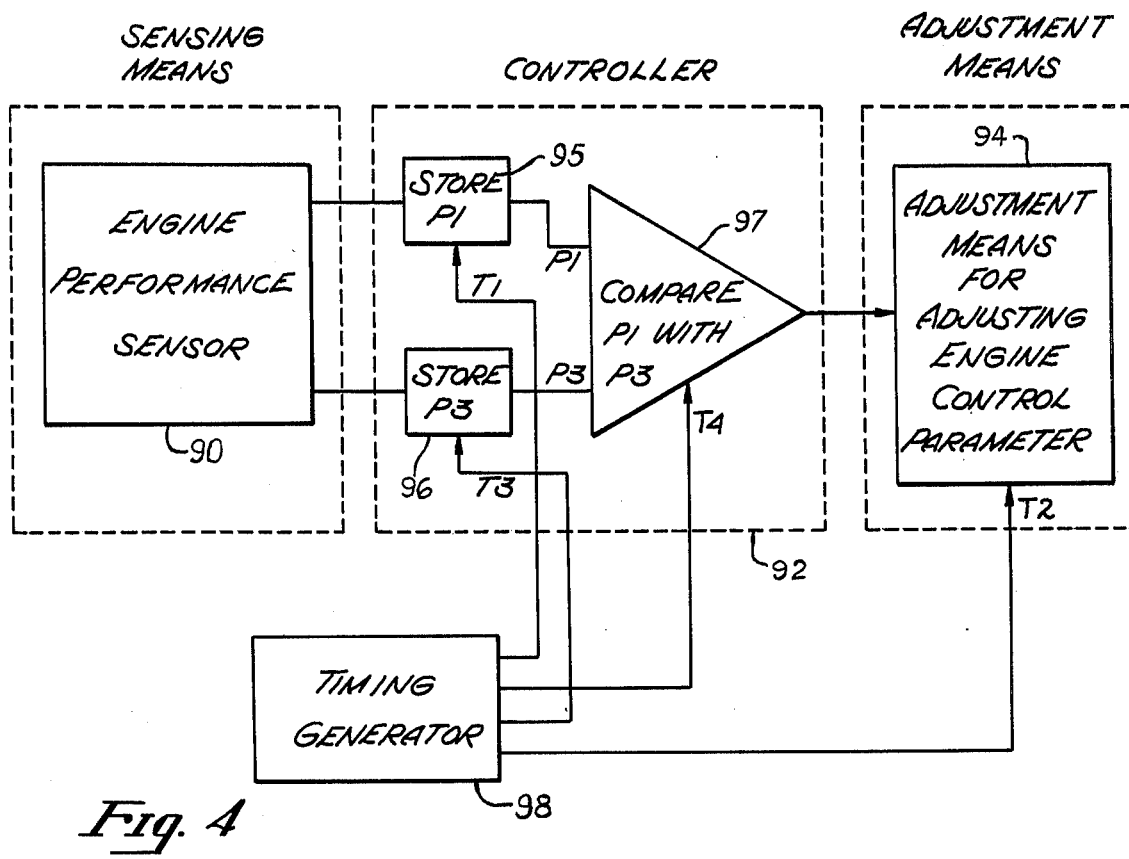
FIG. 4 is a logic block diagram illustrating the function of the preferred embodiment of the controller.

Referring now to FIG. 4, a logic block diagram of the controller means is shown. The signal storage members 95 and 96 of controller 92 receive the sensor signal from sensor 90, which signal is representative of the engine performance, e.g. engine speed. Storage means 95 and 96 are triggered by pulses T1 and T3, generated by timing generator 98, and store the magnitude of the sensor signal at the time triggered, i.e. P1 and P3. The output of storage means 95 and 96 is set to the magnitude of the stored signal (P1 and P3). Outputs P1 and P3 are coupled to comparing means 97, which when triggered by pulse T4, sets the output control signal to a value indicative of the relative magnitudes of the sensor signal at times T1 and T3. The control signal is coupled to adjustment means 94, which responds to the control signal when triggered by pulse T2; and adjust the engine control parameter, e.g. the spark timing. Pulses T1, T2, T3 and T4 are generated in cyclic succession. The controller, then, stores the sensor signal magnitude at time T1, adjusts the control parameter at T2, stores the magnitude of the sensor signal at T3, and at T4 compares the respective magnitudes of the control signal stored and issues an appropriate control signal to the adjustment means.

Figure 5:
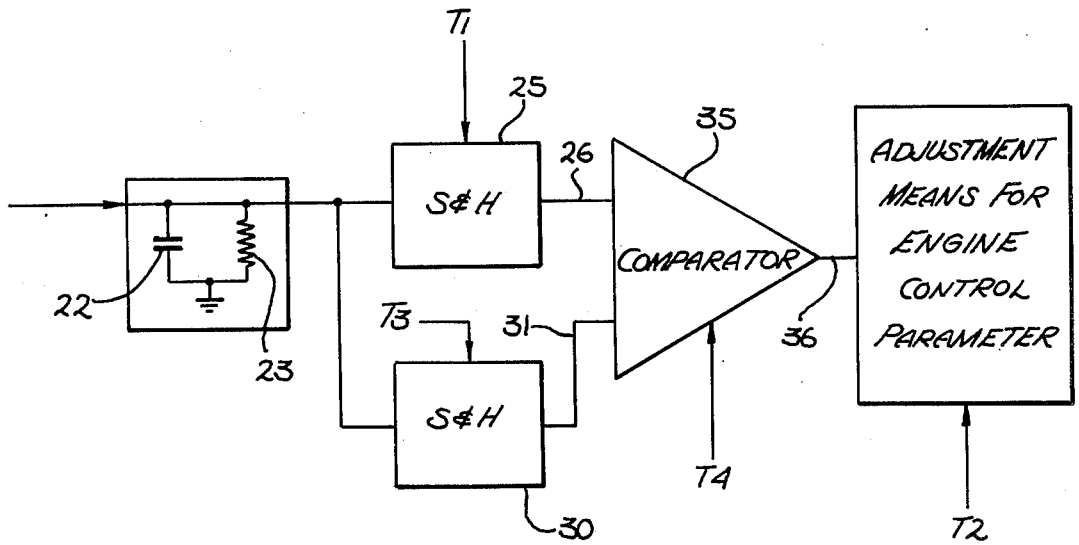
FIG. 5 is a schematic block diagram of an embodiment of the sensor and controller of the present invention.

Referring now to FIG. 5, a schematic block diagram of electronic circuit elements is shown for implementing the sensing means and controller means. Engine revolutions per minute (RPM) or distributor shaft revolution per minute is representative of engine performance; a voltage pulse is picked up as the engine crankshaft or distributor shaft turns through a revolution and coupled to an RC circuit. The circuit voltage will be representative of engine revolutions per minute. The controller means receives as its input the analog signal from the sensing means having a magnitude representative of engine speed. Coupled to this input are first and second sample and hold means 25 and 30. These elements are well-known in the art of electronic logic design and perform the function of sampling the magnitude of the input signal when triggered by a clock impulse, and setting the output of the sample and hold means equal to the magnitude of the sampled input. This output signal is maintained until the sample and hold means is triggered by another clock impulse. Sample and hold means 25 is triggered by clock line T1; sample and hold means 30 is triggered by clock line T3, occurring later than T1. As will be explained more fully hereinbelow, at time T2, an adjustment to the spark timing is triggered. The output lines 26 and 31 of sample and hold means 25 and 30 are connected to and comprise the input signals to comparator 35. Comparator 35 is also an element well-known in the art, and performs the function of comparing the magnitudes of signals 26 and 31, when triggered by clock impulse T4, and producing a three state output indicative of the magnitude of signal 26 relative to signal 31. The "zero" state indicates that the magnitudes of signals 26 and 31 are equal. The "negative" (−) state indicates that signal 26, proportional to the engine speed at time T1, is larger than signal 31 proportional to engine speed at time T3; therefore the (−) signal indicates that engine speed was greater at T1 than at T2. Conversely, the "positive" (+) state indicates that engine RPM was lower at time T1 than at T3; the zero state indicates no change occurred in engine RPM in the time interval from T1 to T3. Therefore, output signal 36 comprises a control signal for advancing or retarding the spark timing. If greater sophistication is warranted, a comparator may be used having multiple levels in the positive and negative states, indicating the magnitude of the disparity between the two signals 26 and 31. The control signal may then be used to advance or retard the spark by incremental steps proportional in size to the magnitude of the control signal, thereby reducing the number of iterations needed to rach a steady state.

Figure 6:
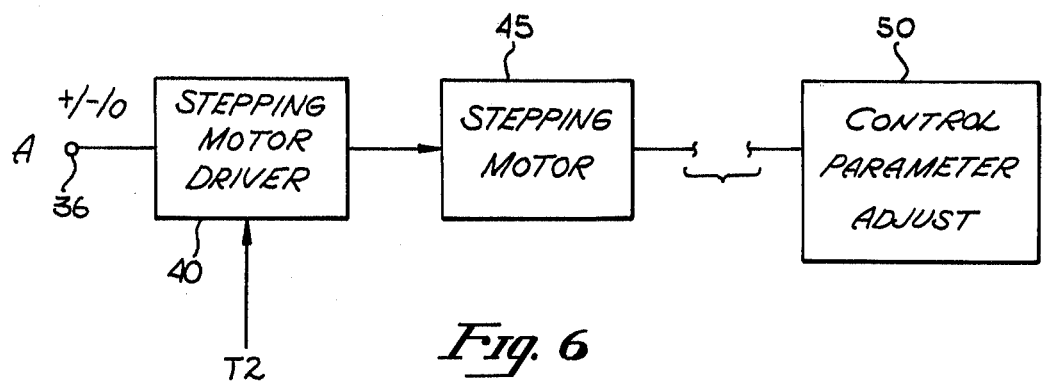
FIG. 6 is a schematic block diagram of an embodiment of the adjustment means for adjusting the spark timing.

Referring now to FIG. 6, a schematic diagram of a mechanical embodiment of the adjustment means for adjusting the spark timing is shown. As has been discussed, the spark timing is conventionally manually adjusted by the mechanic rotating the distributor housing (to which the control breaker points are coupled) until the desired spark timing is achieved; the distributor housing is then secured in place. In the embodiment shown in FIG. 6, a stepping motor is coupled to the distributor housing so that actuation of the stepping motor rotates the housing through a predetermined angle. The coupling is by conventional means, such as gearing, and is not shown. Stepping motor driver 40 receives the control signal 36 and actuates motor 45, incrementally rotating the distributor housing in a direction dependent upon the direction of the previous incremental rotation and the polarity of control signal 36. Between receipt of control signals, the motor is locked in the position achieved during the incremental stepping process. Such stepping motors and drivers are well-known in the art and need not be further described.

The controller and the spark timing adjustment means are controlled by timing inpulses T1, T2, T3 and T4. These impulses are cyclic pulse trains, pulse T2 occurring after T1, T3 spaced from T2. T3 may be selected to occur a relatively long time after T2, when the adjustment is made to the timing, to allow the inertia of the engine to be overcome. Of course, the comparison of engine speeds at times T1 and T3 become a better indication of the effects of the timing change, as the interval between T2 and T3 is increased.

Figure 7:
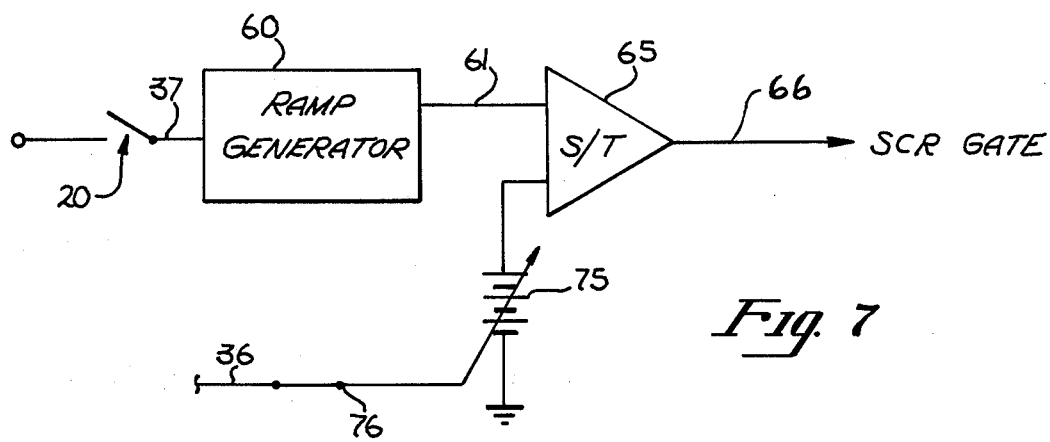
FIG. 7 is a schematic diagram of an alternative embodiment of the means for adjusting the spark timing.

While the mechanical means for adjusting the spark timing shown in FIG. 6 is compatible with the conventional Kettering ignition system shown in FIG. 1, the stepping motor and coupling means is somewhat expensive. Referring now to FIG. 7, an alternate embodiment of the means for adjusting the spark timing is shown. This embodiment is complete electronic and is designed for use with the capacitive discharge ignition system shown in FIG. 2 or with any other ignition system utilizing an electronic switch, such as the "transistorized" ignition system which are well-known in the art. Ramp generator 60 is triggered by the opening of breaker points 20. The ramp output 61 is coupled as an input to Schmitt trigger 65; the second input to the Schmitt trigger 63 is variable voltage source 75. The output 66 from the trigger 65 is coupled to the gate of the SCR of the ignition system. Control signal 36 is coupled to the control gate 76 of variable voltage source 75 and controls the magnitude of the voltage. The circuit operates in the following manner. When the breaker points 20 are opened by rotation of the distributor shaft, the ramp generator is triggered and commences generation of the ramp voltage. Variable voltage source 75 is set to a predetermined level by the controller. When the magnitude of the ramp voltage is equivalent to that of the voltage source, the Schmitt trigger 65 is triggered. The pulse output of the Schmitt trigger 35 fires the SCR.

Control line 36 of the controller circuit is coupled to the control gate 76 of the variable voltage source. Therefore the voltage level of source 75, and hence the instant of firing of the SCR is varied by the controller circuit. The timing of pulses T1, T2, T3 and T4 must be adapted to the alternate embodiment, however. T2, causing adjustment of the voltage level, should occur prior to the opening of breaker points 20, as the required delay may be zero. T1 may then occur at the same instant, or before T2. T3 will, as before, occur a sufficiently later instant in time to allow the effect of the change in timing to overcome the inertia of the engine and/or vehicle, and be perceptible to the system. T4 may occur after T3, or simultaneously. Therefore the timing of the clock pulses may be selected in accordance with the characteristics of the particular engine and/or vehicle. Since the breaker points of an eight cylinder engine open and close about 133 times per second at an engine speed of 2000 RPM, T3 may be selected to occur only with every 10th opening of the breaker points, or even less often, e.g. every 100th or 1000th opening of the point, with engines having higher inertia. With this system, the timing generator would include a counter coupled to the points 20 to produce the pulse T3 only on the desired iteration of the opening of the points 20.

The alternate embodiment of the timing adjustment means shown in FIG. 7 thus functions to introduce a delay between the opening of the contact points and the firing of the SCR, and hence firing of the spark plug. The delay is variable, and automatically adjusted to maximize engine speed. It is anticipated that spark advance will be necessary under some conditions to maximize RPM. While the present system is limited in that it may only introduce delay from the instant the points open, the capability of effectively advancing the timing may be achieved by manually pre-setting the timing, by rotating the distributor housing, to achieve a highly advanced, preset condition. The timing adjustment circuit of FIG. 7 will then introduce sufficient delay to provide a properly timed spark. This circuit then has the advantage of being completely electronic, and eliminating the necessity for the stepping motor and coupling means of FIG. 5.

Figure 8:
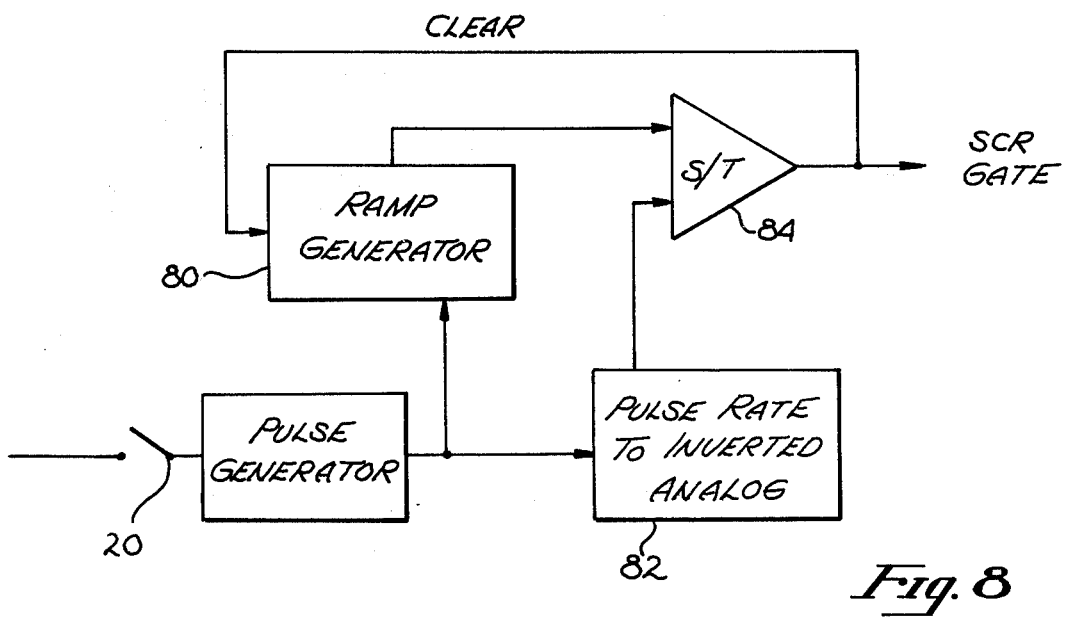
FIG. 8 is a schematic diagram of a second alternative embodiment of the adjustment means for adjusting the spark timing.

Referring now to FIG. 8 another alternative embodiment of the present invention is shown. While this embodiment is adapted for firing the SCR of the capacitive discharge ignition, it could as well be adapted to trigger any other electronic switch, as for example, the transistor switch in transistorized ignitions. The breaker points 20 are used to provide a reference pulse to trigger ramp generator 80 and as an input to converter 82. Converter 82 is a pulse-rate-to-inverted analog converter, receiving the pulses from the breaker points and producing an analog signal proportional to the rate at which pulses are received. This analog signal is then inverted, i.e. zero pulses produces the highest analog output, and a very rapid switching of the points 20 causes a lowest, "zero" state output. The design of such a converter is well within the purview of one skilled in the art, and need not be further described. The analog output from converter 82 and ramp generator 80 are coupled to Schmitt trigger 84. The trigger 84 will fire when the voltage level of the ramp generator 80 is equivalent to that of the converter 82. The trigger pulse is coupled to the gate of the SCR for firing the SCR, and also is fed back as a clearing signal to clear the ramp generator. Therefore, the disclosed circuit introduces a variable delay in the firing of the SCR, longest for low speed operation, and decreasing as engine speed increases, and hence a delay or retardation in the spark timing.

As in the embodiment of FIG. 7, the distributor housing will be manually preset to give a highly advanced spark timing. The electronic controller then automatically provides the proper spark timing delay or retardation to maximize the engine speed for a given throttle setting.

The embodiments shown in FIGS. 4–8 are examples of electronic means for implementing the present invention. Other electronic circuits may readily be devised; for example, digital circuit techniques could well be utilized.

The embodiments shown in FIGS. 4–8 have utilized the spark timing as the engine control parameter which is varied to maximize engine speed. Instead of varying the spark timing, another engine control parameter could be tuned to optimize the engine speed, as for example, the fuel mixture to the cylinders. Instead of utilizing mechanical or electronic means to vary the spark timing, a adjustable valve controlled by the controller circuit could be utilized to vary the fuel mixture. Another engine control parameter which could be tuned by the present invention is the amount of pressure boost provided by turbochargers fitted to some engines. Other engine control parameters will occur to those skilled in the art and which may be tuned in accordance with the present invention.

Although this invention has been disclosed and described with reference to particular embodiments, the principles involved are susceptible of other applications which will be apparent to persons skilled in the art. Thus, various changes in form, detail and application of the present invention may be made without departing from the spirit and scope of the invention.

I claim:
1. In an internal combustion engine having an ignition system for providing a timed spark to ignite the fuel and air mixture, said system being of the variety which includes an electronic switch such as the capacitive discharge-type ignition system, an improvement comprising:
   a sensing means for providing a signal representative of the speed of said engine;
   an electronic controller coupled to said sensing means, said controller comprising:
   (i) first storing means for storing the magnitude of said sensing means signal at a first instant of time;
   (ii) second storing means for storing the magnitude of said sensing means signal at a second instant of time; and
   (iii) comparing means coupled to said first and second storing means, said comparing means being a means for comparing said stored magnitudes and for providing an output control signal indicative of the relative magnitudes of said stored magnitudes;
   adjustment means coupled to said electronic controller, said adjustment means including:
   (i) means for generating a first electronic signal having a voltage which is a function of said output control signal;
   (ii) means for generating a second electronic signal having a ramp voltage; and
   (iii) a Schmitt trigger for comparing the magnitudes of said first and second electronic signals and providing a switching signal to said electronic switch when said first and second signals are equivalent;
   whereby said timed spark will be automatically adjusted to maximize the speed of said engine.

* * * * *